(12) United States Patent
Fernández Latasa

(10) Patent No.: US 10,884,439 B2
(45) Date of Patent: Jan. 5, 2021

(54) LIQUID METERING DEVICE FOR METERING PUMPS

(71) Applicant: ADVANCED DEVELOPMENT AND INNOVATION, S.L., Derio (ES)

(72) Inventor: Jon Fernández Latasa, Derio (ES)

(73) Assignee: Advanced Development and Innovation, S.L., Derio (ES)

( * ) Notice: Subject to any disclaimer, the term of this patent is extended or adjusted under 35 U.S.C. 154(b) by 0 days.

(21) Appl. No.: 16/641,723

(22) PCT Filed: Aug. 25, 2017

(86) PCT No.: PCT/ES2017/070586
§ 371 (c)(1),
(2) Date: Feb. 25, 2020

(87) PCT Pub. No.: WO2019/038457
PCT Pub. Date: Feb. 28, 2019

(65) Prior Publication Data
US 2020/0362849 A1 Nov. 19, 2020

(51) Int. Cl.
*G05D 16/04* (2006.01)
*F04B 49/10* (2006.01)
(Continued)

(52) U.S. Cl.
CPC ......... *G05D 16/0404* (2019.01); *F04B 13/00* (2013.01); *F04B 49/08* (2013.01);
(Continued)

(58) Field of Classification Search
CPC .............. F04B 53/1072; F04B 49/10; Y10T 137/2645; Y10T 137/2642; Y10T 137/2647; G05D 16/0404; G05D 16/0672
See application file for complete search history.

(56) References Cited

U.S. PATENT DOCUMENTS

| | | | |
|---|---|---|---|
| 1,995,480 A | * | 3/1935 | Murphy ............... F02M 37/46 137/115.27 |
| 2,032,284 A | * | 2/1936 | Johnston ............ G05D 16/0402 137/115.27 |

(Continued)

FOREIGN PATENT DOCUMENTS

| | | |
|---|---|---|
| ES | 2523795 A1 | 12/2014 |
| GB | 2066375 A | 7/1981 |
| WO | 1999/066269 A1 | 12/1999 |

OTHER PUBLICATIONS

International search report for PCT/ES2017/070586, dated May 4, 2018, 4 pages.

(Continued)

*Primary Examiner* — Kevin F Murphy
(74) *Attorney, Agent, or Firm* — Danielson Legal LLC

(57) ABSTRACT

The present invention relates to a liquid metering device (1) for metering pumps which is formed by a main longitudinal conduit (2) with a first and second opposite ends (2.1, 2.2) comprising a fluid inlet (3) at the first end (2.1) located perpendicular thereto, a first outlet (4) at the second end (2.2), and a first connection (5) to backpressure control means (6), a second connection (7) to safety means (8), acting in parallel and in an independent manner, and a second overpressure outlet (9), arranged in one and the same connecting section (10), and where said connecting section (10) has an inclined wall (11) allowing the fluid to exit through the first outlet (4) for a fluid pressure equal to or greater than a fixed backpressure value and the fluid to exit through the second outlet (9) for a pressure greater than a fixed value.

9 Claims, 6 Drawing Sheets

(51) Int. Cl.
*F04B 13/00* (2006.01)
*G01L 19/00* (2006.01)
*G05D 16/06* (2006.01)
*F04B 49/08* (2006.01)

(52) U.S. Cl.
CPC .......... *F04B 49/10* (2013.01); *G01L 19/0023* (2013.01); *G05D 16/0636* (2013.01); *Y10T 137/2642* (2015.04); *Y10T 137/2645* (2015.04); *Y10T 137/2647* (2015.04)

(56) References Cited

U.S. PATENT DOCUMENTS

| | | |
|---|---|---|
| 2,843,045 A | 7/1958 | Mashinter |
| 5,857,486 A * | 1/1999 | Walker .................. F16K 17/085 137/115.27 |
| 7,669,610 B2 * | 3/2010 | Larsen ................. G05D 16/106 137/508 |
| 9,098,094 B2 * | 8/2015 | Carmody ............. G05D 16/185 |
| 2017/0060147 A1 * | 3/2017 | Muir ....................... F16K 17/02 |

OTHER PUBLICATIONS

Written opinion for PCT/ES2017/070586, dated May 4, 2018, 6 pages.
Translation of ES2523795, 6 pages.

* cited by examiner

LIQUID METERING DEVICE FOR METERING PUMPS

CROSS REFERENCE TO RELATED APPLICATIONS

This application is the national phase of International (PCT) Patent Application No. PCT/ES2017/070586, filed internationally on Aug. 25, 2017, the entire disclosure of which is hereby incorporated by reference in its entirety.

TECHNICAL FIELD OF THE INVENTION

The present invention relates to the technical field of metering pumps, specifically to a liquid metering device for pumps of this type, comprising all the fittings these pumps require for a correct and precise metering.

BACKGROUND OF THE INVENTION

Metering pumps work to draw a volume of liquid and introduce it into the metering line with the discharge stroke. They are every widely used in many production processes in which accurate metering of a medium is required.

A metering pump installation is complemented with various fittings to improve precision, make maintenance easier and reduce the risk of accident. These fittings can be, among others, safety means to ensure safety against overpressures in the circuit, a pulsation dampener for dampening pulsations in the hydraulic line of the circuit, a pressure-gauge, a gas purging valve, a backpressure valve, etc.

Currently, these fittings of the metering pump are connected to the metering system at several points thereof, which entails a need for a specific space to install each of them and subsequent problems in places where this space is limited.

Furthermore, this arrangement involves complicated connection designs which make the subsequent access to each of these fittings to perform cleaning or maintenance tasks difficult.

Reference patent document ES2523795 can be mentioned as an example of the state of the art.

This patent document discloses equipment for the controlled metering of fertilizers and is configured from a tank with an outlet duct which incorporates at the final end thereof a metering unit to which there is coupled an applicator with nozzles through which the fluid is distributed. This equipment further comprises a conductivity meter located inside the tank in contact with the fertilizer solution, a vehicle speed measuring system, a pressure sensor and an electromagnetic flowmeter which measure flow rate changes in the outlet duct, a control key also installed in the outlet duct, after the pressure sensor and the flowmeter, and a programmable automatic PC, to which there are connected the conductivity meter, the speed measuring system, the pressure sensor, the flowmeter and the control key.

This case involves a metering unit with various fitting elements for the pump that are connected to the equipment at several points thereof and therefore take up considerable space. Furthermore, this equipment is not entirely mechanical, which is a drawback.

There is no metering device known in the state of the art today that contains all the connections of the fittings to the metering pump. Currently, there are systems that must be made in situ by connecting each of the necessary elements of the system which requires significant assembly times and the result of which has potential leak points. Furthermore, these systems have the additional drawback of not knowing whether or not metering of the reagent is being carried out.

DESCRIPTION OF THE INVENTION

The liquid metering device for metering pumps proposed herein is formed by a main longitudinal conduit with a first and second opposite ends comprising a fluid inlet suitable for the connection thereof to a metering pump, arranged at the first end of the main conduit in a manner perpendicular thereto, and a first backpressure fluid outlet arranged at the second end of the main conduit.

The main conduit further comprises a first connection to backpressure control means, a second connection to safety means and a second overpressure fluid outlet, arranged in one and the same connecting section of the main conduit close to the second end thereof.

These first and second connections are located opposite one another with respect to the axis of the main conduit such that the backpressure control means and the safety means act in parallel and in an independent manner.

Likewise, the main conduit has inside said connecting section an inclined wall for distributing the fluid to the backpressure control means and to the safety means and allows the fluid to exit through the first outlet of the main conduit when the fluid pressure is equal to or greater than a fixed backpressure pressure value and the fluid to be discharged through the second outlet of the main conduit, when the fluid pressure is equal to or greater than a fixed safety value.

According to a preferred embodiment, the backpressure control means comprise a leaktight membrane in attachment with the first connection, a spring element secured at a first end to a first part arranged adjacent to the leaktight membrane and at a second end to a second part arranged opposite the first part and connected to the backpressure means by threading means and, means for indicating the presence or absence of the metering of fluid through the first outlet of the main conduit.

In this case and in a preferred embodiment, said means for indicating the presence or absence of the metering of fluid are formed by a visual element secured to the threading means and connected to the first part by means of a connecting shaft, such that it has a first visible, elevated position when the fluid pressure is greater than the fixed backpressure pressure value and moves the membrane allowing the passage of the fluid to the first backpressure fluid outlet, and a second hidden position when the pressure is less than the fixed backpressure pressure value.

According to a preferred embodiment, the safety means comprise a leaktight membrane in attachment with the second connection, a spring element secured at a first end to a first part arranged adjacent to said leaktight membrane and at a second end to a second part arranged opposite the first part and connected to the safety means by threading means, and depressurizing means of the device, formed by a handle connected to the first part.

According to a preferred embodiment, the device comprises a series of additional connections arranged between the first end of the main conduit and the first and second connections thereof.

In this case and in a preferred embodiment, the device comprises a gas release mechanism integrated in a first additional connection, arranged before the first and second connections according to the direction of the fluid.

Likewise, according to a preferred embodiment, the device comprises a dampener connected in a second additional connection arranged at the first end of the main body, perpendicular to the axis thereof and opposite the fluid inlet.

Likewise, in a preferred embodiment, the device comprises a pressure-gauge connected in a third additional connection located after the first end and has a membrane separating same from said pressure-gauge.

According to a preferred embodiment, the device comprises fixing means for fixing to a securing element formed by at least two projections located between the first and second ends of the main body which have a metal insert suitable for being connected to a screwed element.

A significant improvement over the state of the art is obtained with the liquid metering device for metering pumps proposed herein.

This is due to the fact that the present invention successfully arranges all the elements required for a correct metering of liquids in a single piece of equipment, thereby improving the ease of installation and saving space. A significant reduction of leak points is also achieved and metering information is obtained.

Furthermore, as a result of arranging the safety means and the backpressure control means in parallel, they are independent and a device with a simultaneous operation of both controls is achieved.

It is therefore a simple and very effective device.

BRIEF DESCRIPTION OF THE DRAWINGS

In order to aid to better understand the features of the invention according to a preferred practical embodiment thereof, a series of drawings in which the following has been depicted with an illustrative and non-limiting character is provided as an integral part of said description.

DETAILED DESCRIPTION OF A PREFERRED EMBODIMENT OF THE INVENTION

Figure 1:
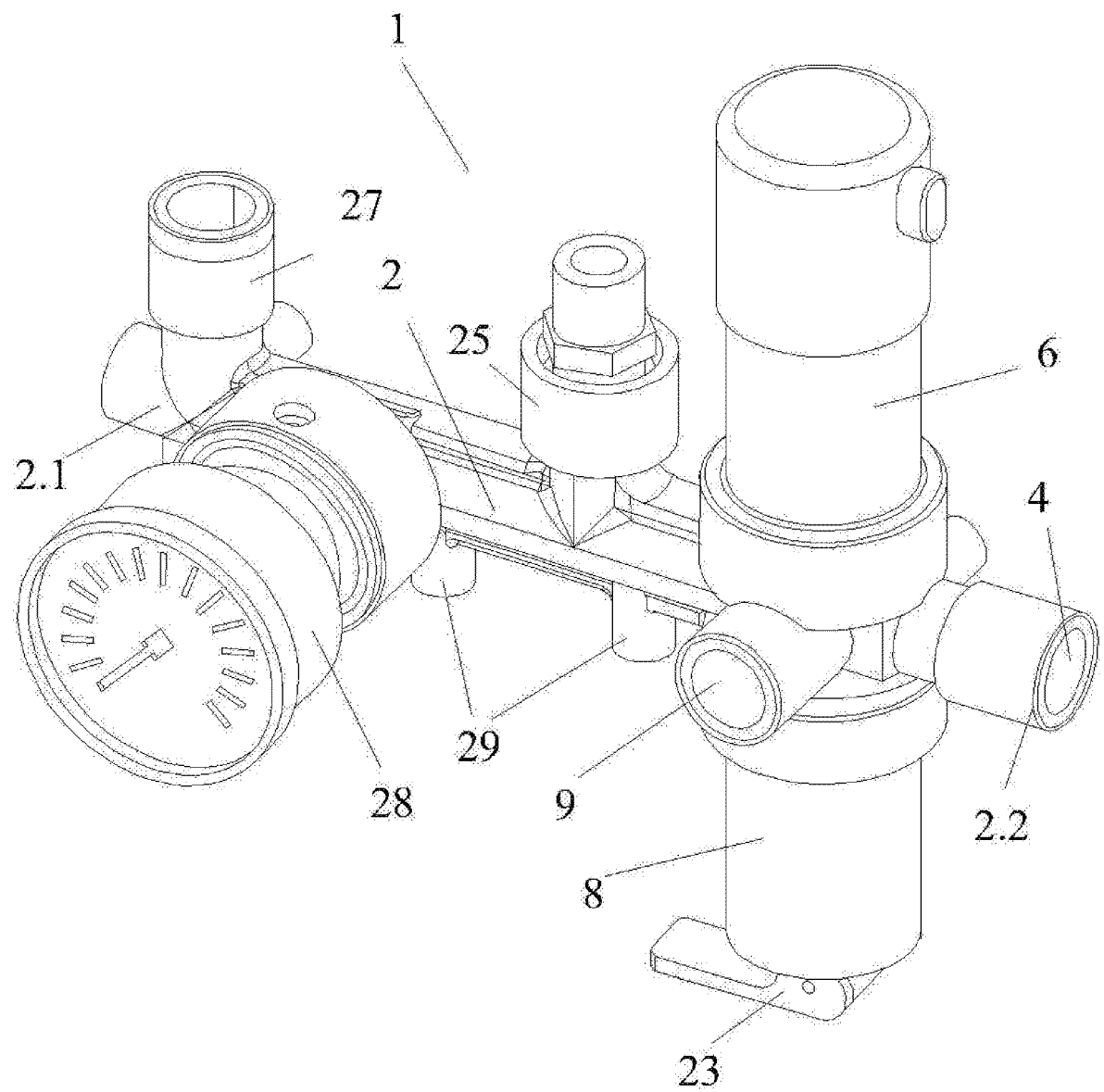
FIG. 1 shows a perspective view of the liquid metering device for metering pumps, in a preferred embodiment of the invention.
Figure 2:
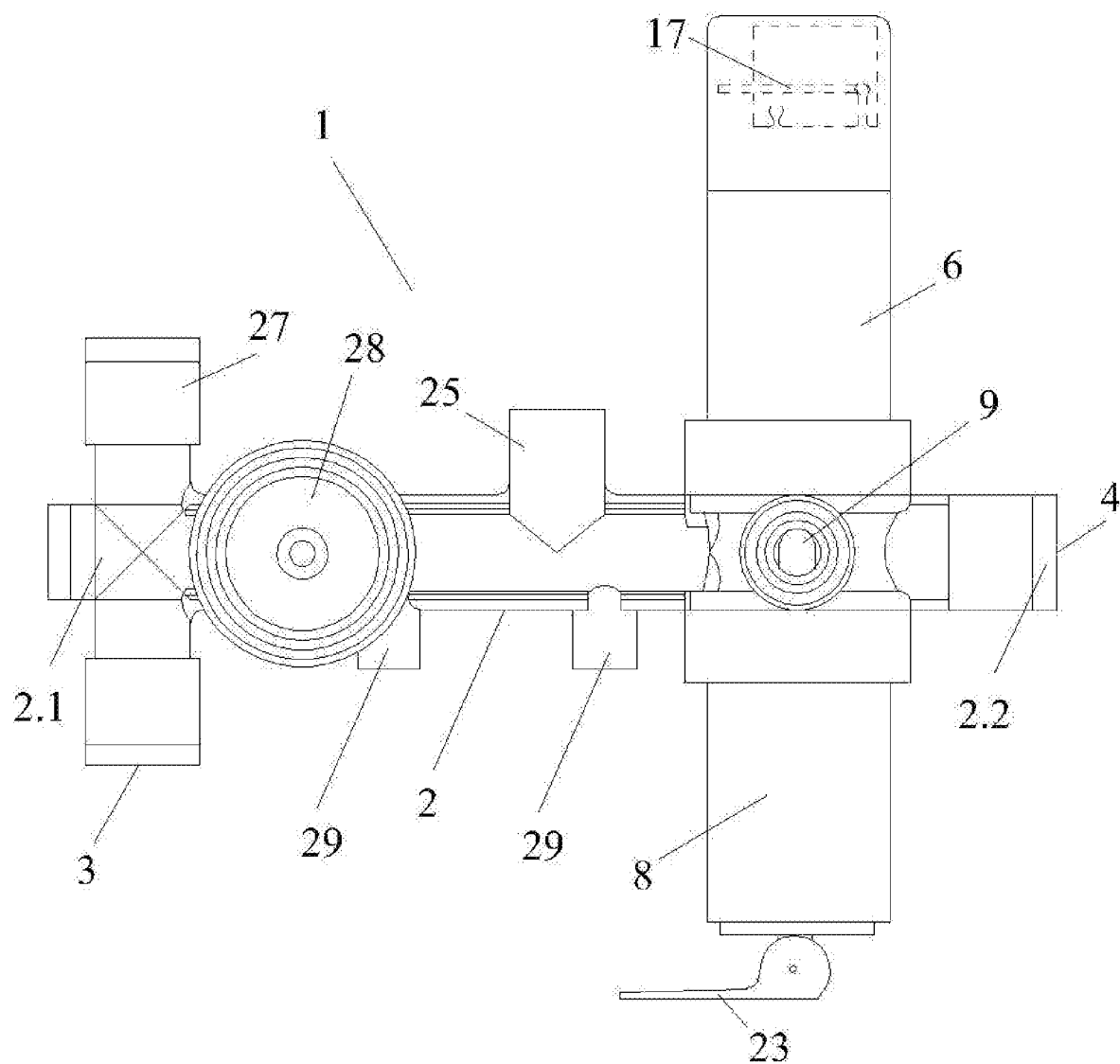
FIG. 2 shows an elevational view of the liquid metering device for metering pumps, in a preferred embodiment of the invention.
Figure 3:
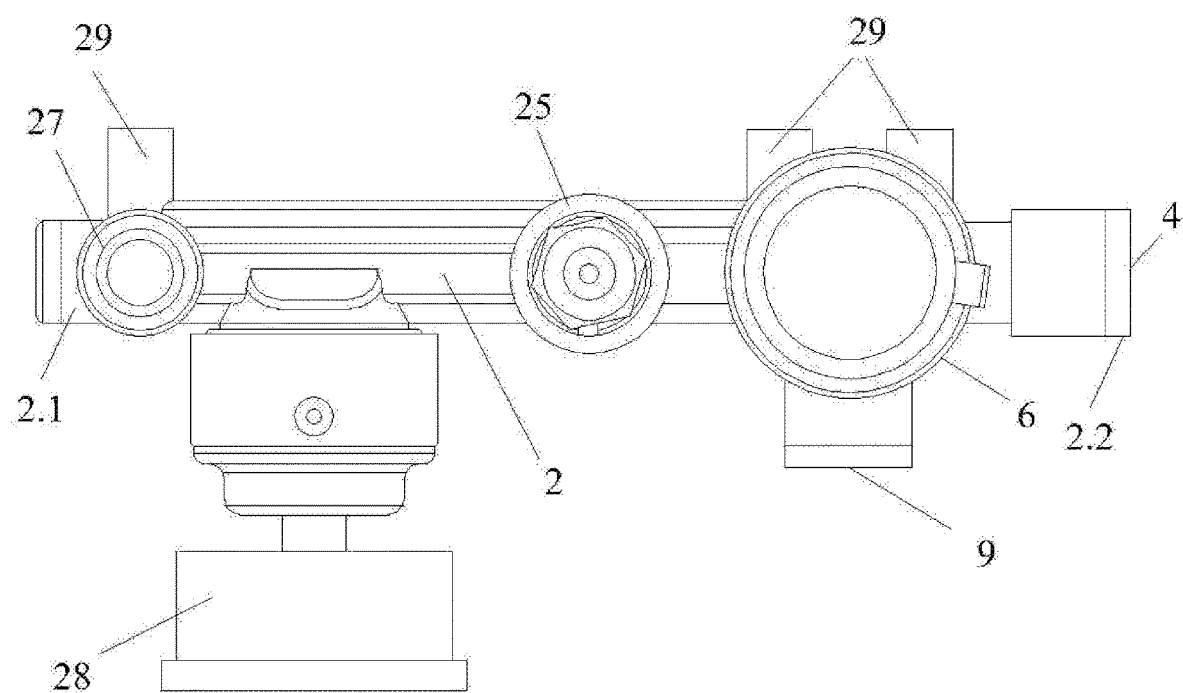
FIG. 3 shows a plan view of the liquid metering device for metering pumps, in a preferred embodiment of the invention.

In view of the drawings that have been provided, it can be seen how in a preferred embodiment of the invention, the liquid metering device (1) for metering pumps proposed herein is formed by a main longitudinal conduit (2) with a first and second opposite ends (2.1, 2.2).

This main conduit (2), as shown in FIGS. 1 to 4, comprises a fluid inlet (3) suitable for the connection thereof to a metering pump (not depicted in the drawings), arranged at the first end (2.1) of the main conduit (2) in a manner perpendicular thereto and, a first backpressure fluid outlet (4) arranged at the second end (2.2) of the main conduit (2).

It can be seen in said FIGS. 1 to 4 that the main conduit (2) further comprises a first connection (5) to backpressure control means (6), a second connection (7) to safety means (8) and a second overpressure fluid outlet (9), arranged in one and the same connecting section (10) of the main conduit (2) close to the second end (2.2) thereof.

Said first and second connection (5, 7) are located opposite one another with respect to the axis of the main conduit (2) such that the backpressure control means (6) and the safety means (8) act in parallel and in an independent manner.

Figure 5:
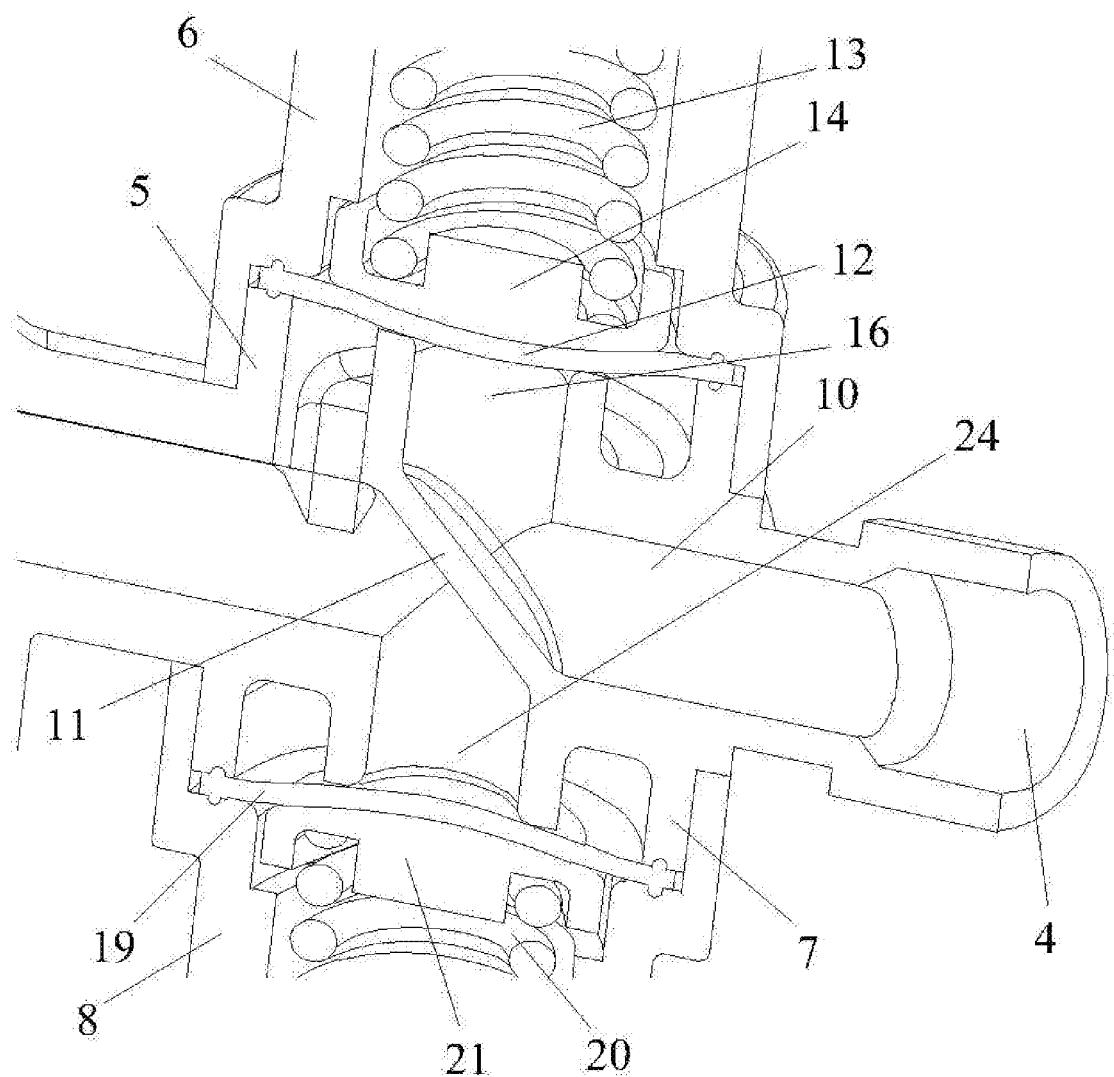
FIG. 5 shows a perspective view of a detailed longitudinal half of the area of the connecting section of the liquid metering device for metering pumps, in a preferred embodiment of the invention.
Figure 6:
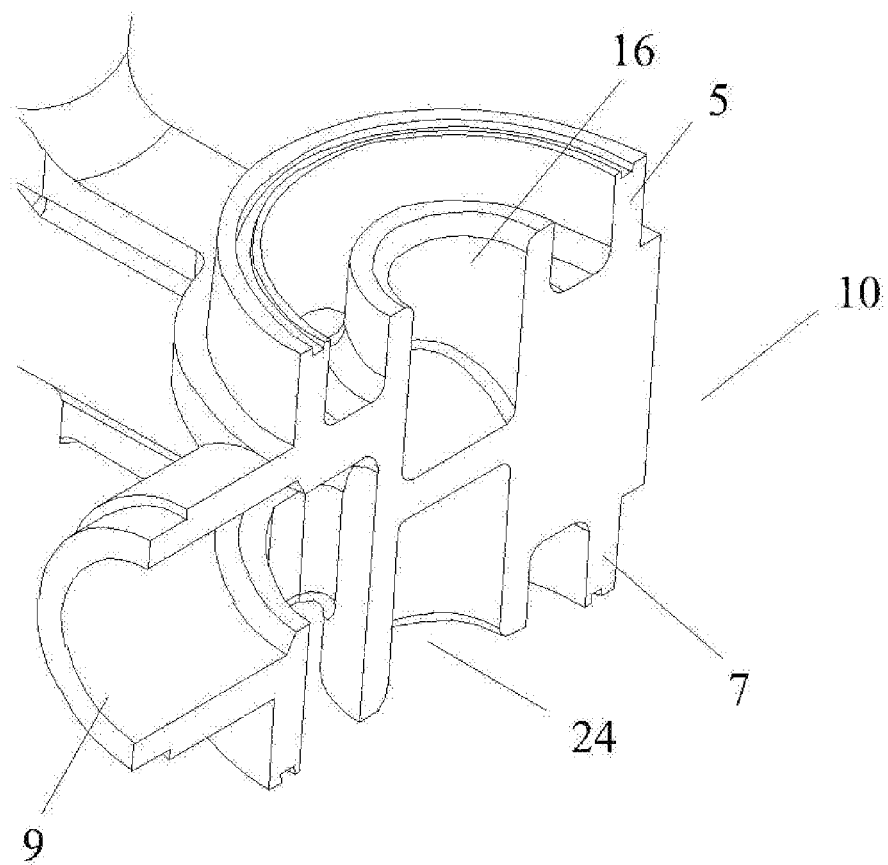
FIG. 6 shows a perspective view of a transverse half of the connecting section of the liquid metering device for metering pumps, in a preferred embodiment of the invention.

As can be seen in FIGS. 5 and 6, the main conduit (2) has inside said connecting section (10) an inclined wall (11) for distributing the fluid to the backpressure control means (6) and to the safety means (8) and, allows the fluid to exit through the first outlet (4) of the main conduit (2) when the fluid pressure is equal to or greater than a fixed backpressure pressure value, and the fluid to be discharged through the second outlet (9) of the main conduit (2) when the fluid pressure is equal to or greater than a fixed safety value.

As a result of that parallel arrangement and of the design of this connecting section, the device (1) present a simultaneous operation for the control of backpressure, as well as of the safety means against overpressures.

Figure 4:
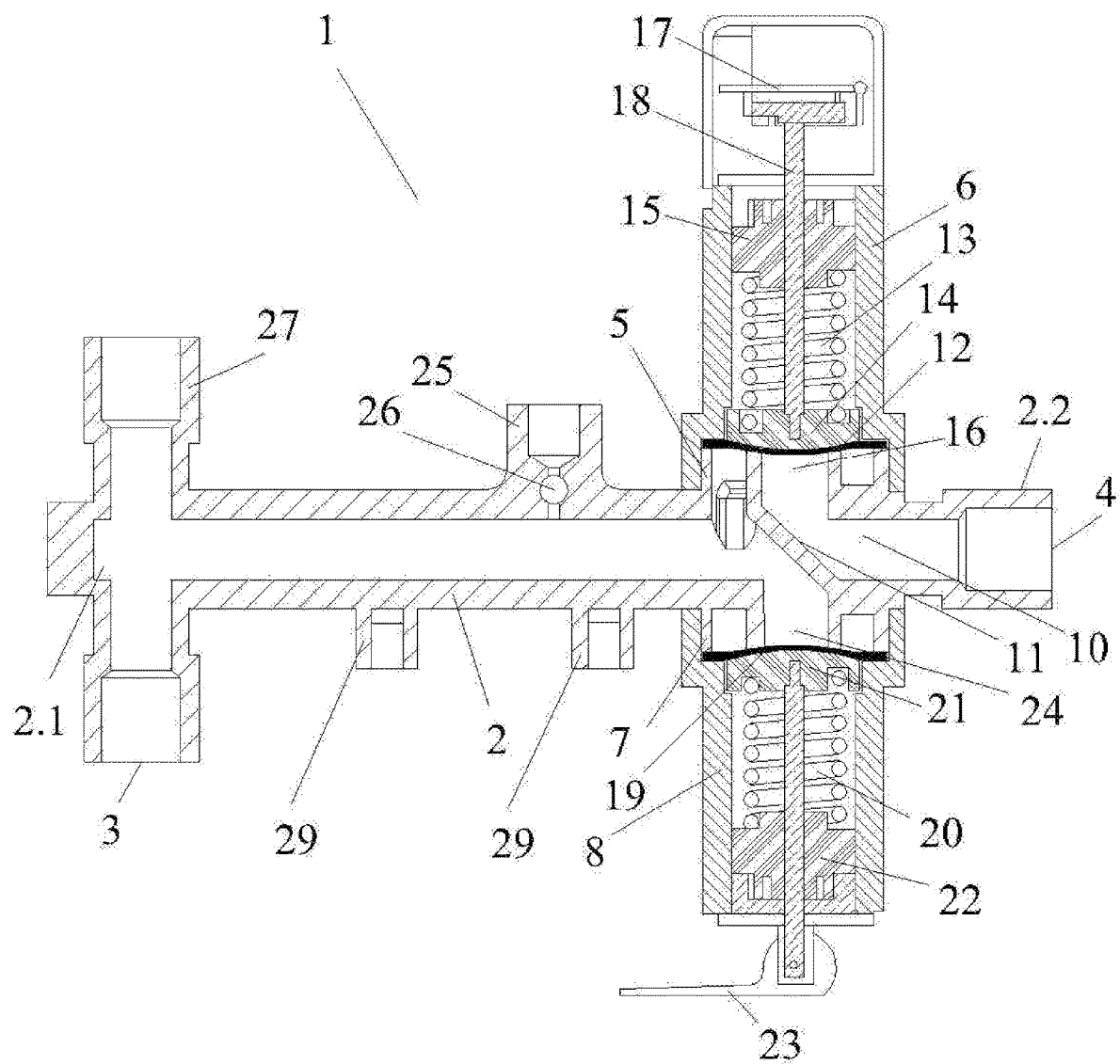
FIG. 4 shows a section of the liquid metering device for metering pumps, in a preferred embodiment of the invention.

Therefore, in this preferred embodiment of the invention as shown in FIGS. 4 and 5, the backpressure control means (6) comprise a leaktight membrane (12) in attachment with the first connection (5), a spring element (13) secured at a first end to a first part (14) arranged adjacent to the leaktight membrane (12) and at a second end to a second part (15) arranged opposite the first part and connected to the backpressure means (6) by threading means and, means for indicating the presence or absence of the metering of fluid through the first outlet (4) of the main conduit (2).

The fixed backpressure pressure value is therefore determined by means of threading in the second part (15) which, when rotated clockwise, compresses the spring element (13) which in turn transmits the force thereof to the adjacent first part (14) in contact with the leaktight membrane (12).

This membrane (12) creates leaktightness between these backpressure control means (6) and the first connection (5) of the main conduit (2). Therefore, the fluid is in continuous contact with the membrane (12) when it reaches the connecting section (10) of the main conduit (2), and in the case of a fluid pressure less than the fixed backpressure pressure value, it is not capable of lifting the membrane (12) and therefore a first access (16) to the first outlet (4) of the main conduit (2) existing in the inner shape of the connecting section (10) is closed and the fluid cannot access said first outlet (4).

In contrast, if the fluid pressure is greater than the fixed backpressure pressure value, the force transmitted by fluid to the membrane (12) is greater than the force exerted thereon by the spring element (13), therefore being capable of moving the membrane (12), and allowing the passage of the fluid through the first access (16) to the first outlet (4) existing inside the connecting section (10). Therefore, in this case the fluid can access the first outlet (4) of the main conduit (2).

It can be seen in FIG. 4 that said means for indicating the presence or absence of the metering of fluid are formed by a visual element (17) secured to the threading means and connected to the first part (14) by means of a connecting shaft (18). Therefore, in the case in which the fluid pressure is greater than the fixed backpressure pressure value, it has been indicated that the fluid is capable of moving the membrane (12) and therewith the first part (14) adjacent thereto. By moving this first part (14), the connecting shaft (18) also moves and it moves the visual element (17) to a first visible, elevated position. When the fluid pressure does not reach the fixed backpressure value, the visual element (17) remains in a second hidden position, since the fluid does not exert sufficient force to move the membrane (12), and therefore the connecting shaft (18) remains in its lowest position. The visual element (17) has been depicted in this FIG. 4 in a second hidden position.

On the other hand, in this preferred embodiment of the invention, the safety means (8) comprise a leaktight membrane (19) in attachment with the second connection (7), a spring element (20) secured at a first end to a first part (21) arranged adjacent to said leaktight membrane (19) and at a second end to a second part (22) arranged opposite the first part and connected to the safety means (8) by threading means, and depressurizing means of the device, formed by a handle (23) connected to the first part (21).

In this case, the fixed safety pressure value is regulated by threading means of the second part (22) of the safety means. By rotating it clockwise, the spring element (20) is compressed and it transmits force to the first part (21) in contact with the membrane (19). This membrane (19) creates leaktightness between the safety means (8) and the main conduit (2), the fluid being in continuous contact with said membrane (19).

In the case in which the force transmitted by the fluid to the membrane (19) exceeds the fixed safety pressure value, the fluid is capable of moving the membrane and can pass through a second access (24) of the main conduit (2) which allows the fluid to access the second outlet (9) thereof. This second access (24) is part of the inner shape of the connecting section (10) but if the fluid pressure is less than the fixed safety value, as the fluid is not capable of moving said membrane (19) of the safety means (8), this access is closed by the membrane (19) itself.

Furthermore, as shown in FIGS. 1 to 4, in this preferred embodiment of the invention, the device (1) comprises a series of additional connections arranged between the first end (2.1) of the main conduit (2) and the first and second connections (5, 7) thereof.

Therefore, in this preferred embodiment of the invention, the device (1) comprises metering pump fittings, consisting of a gas release mechanism, a dampener and a pressure-gauge (not depicted in the drawings), connected to said additional connections.

As shown in FIGS. 1 to 4, the gas release mechanism is integrated in the device in a first additional connection (25) located before the first and second connections (5, 7) according to the direction of the fluid.

The dampener is connected to a second additional connection (27) located at the first end (2.1) of the main body (2), perpendicular to the axis thereof and opposite the fluid inlet.

On the other hand, the pressure-gauge is connected in a third additional connection (28) arranged after the first end (2.1) and has a membrane separating same from said pressure-gauge.

As can be seen in FIGS. 1 to 4, in this preferred embodiment of the invention, the device (1) comprises fixing means (29) for fixing to a securing element which, in this case, are formed by two projections in the lower portion and three projections in the rear portion, all of them being located between the first and second ends (2.1, 2.2) of the main body (2) and where these projections have a metal insert suitable for being connected to a screwed element.

The embodiment that has been described only constitutes an example of the present invention, therefore the specific details, terms and phrases in the present specification must not be considered limiting, but rather must be understood only as a basis for the claims and as a representative basis which provides a comprehensible description as well as sufficient information to the person skilled in the art for applying the present invention.

Significant improvements with respect to the state of the art are achieved with the liquid metering device for metering pumps proposed herein.

A compact device which makes a correct, precise and safe operation of the metering pumps easier, which at the same time takes up very little space and has a simple design making access to the elements easier when required, is therefore achieved.

A significant reduction of leak points, and at the same time a significant decrease in assembly times, are also achieved.

On the other hand, the way of connecting the safety means and the backpressure control means and the special design of the device in the connecting section of both allow for the independent operation of both controls, allowing the device to work with the two safety and backpressure functions simultaneously since they are both independent.

The invention claimed is:

1. Liquid metering device (1) for metering pumps, characterized in that it is formed by a main longitudinal conduit (2) with a first and second opposite ends (2.1, 2.2) comprising
    a fluid inlet (3) suitable for the connection thereof to a metering pump, arranged at the first end (2.1) of the main conduit (2) in a manner perpendicular thereto;
    a first backpressure fluid outlet (4) arranged at the second end (2.2) of the main conduit (2), and;
    a first connection (5) to backpressure control means (6), a second connection (7) to safety means (8) and a second overpressure fluid outlet (9), arranged in one and the same connecting section (10) of the main conduit (2) close to the second end (2.2) thereof, where said first and second connections (5, 7) are located opposite one another with respect to the axis of the main conduit (2) such that the backpressure control means (6) and the safety means (8) act in parallel and in an independent manner, and where the main conduit (2) has inside said connecting section (10) an inclined wall (11) for concentrically distributing the fluid to the backpressure control means (6) and to the safety means (8) and allows the fluid to exit through the first backpressure fluid outlet (4) when the fluid pressure is equal to or greater than a fixed backpressure pressure value and the fluid to be discharged through the second outlet (9), when the fluid pressure is equal to or greater than a fixed safety value.

2. Liquid metering device (1) for metering pumps according to claim 1, characterized in that the backpressure control means (6) comprise a leaktight membrane (12) in attachment with the first connection (5), a spring element (13) secured at a first end to a first part (14) arranged adjacent to the leaktight membrane (12) and at a second end to a second part (15) arranged opposite the first part and connected to the backpressure means (6) by threading means, and means for indicating the presence or absence of the metering of fluid through the first backpressure fluid outlet (4).

3. Liquid metering device (1) for metering pumps according to claim 2, characterized in that the means for indicating the presence or absence of the metering of fluid are formed by a visual element (17) secured to the threading means and connected to the first part (14) by means of a connecting shaft (18), such that it has a first visible, elevated position when the fluid pressure is greater than the fixed backpressure pressure value and a second hidden position when the pressure is less than the fixed backpressure pressure value.

4. Liquid metering device (1) for metering pumps according to claim 1, characterized in that the safety means (8) comprise a leaktight membrane (19) in attachment with the second connection (7), a spring element (20) secured at a first end to a first part (21) arranged adjacent to said leaktight membrane (19) and at a second end to a second part (22) arranged opposite the first part and connected to the safety means (8) by means, and depressurizing means of the device, formed by a handle (23) connected to the first part (21).

5. Liquid metering device (1) for metering pumps according to claim 1, characterized in that it comprises a series of additional connections arranged between the first end (2.1) of the main conduit (2) and the first and second connections (5, 7) thereof.

6. Liquid metering device (1) for metering pumps according to claim 5, characterized in that it comprises a gas release mechanism integrated in a first additional connection (25) arranged before the first and second connections (5, 7) according to the direction of the fluid.

7. Liquid metering device (1) for metering pumps according to claim 6, characterized in that it comprises a dampener connected in a second additional connection (27) arranged at the first end (2.1) of the main body (2), perpendicular to the axis thereof and opposite the fluid inlet (3).

8. Liquid metering device (1) for metering pumps according to claim 7, characterized in that it comprises a pressure-gauge connected in a third additional connection (28) located after the first end (2.1) and has a membrane separating same from said pressure-gauge.

9. Liquid metering device (1) for metering pumps according to claim 1, characterized in that it comprises fixing means (29) for fixing to a securing element formed by at least two projections located between the first and second ends (2.1, 2.2) of the main body (2) which have a metal insert suitable for being connected to a screwed element.

* * * * *